(12) United States Patent
Ann

(10) Patent No.: US 7,343,221 B2
(45) Date of Patent: Mar. 11, 2008

(54) CONTROL SYSTEM OF A ROBOT CLEANER

(75) Inventor: Sung Jin Ann, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 655 days.

(21) Appl. No.: 10/756,388

(22) Filed: Jan. 14, 2004

(65) Prior Publication Data

US 2005/0027395 A1 Feb. 3, 2005

(30) Foreign Application Priority Data

Jul. 31, 2003 (KR) .................... 10-2003-0053175

(51) Int. Cl.
*G06F 19/00* (2006.01)
(52) U.S. Cl. .................... 700/245; 700/254; 700/258
(58) Field of Classification Search ................ 700/245, 700/247, 249, 254, 258, 259, 262, 264; 318/568.11, 318/568.12, 568.16, 587
See application file for complete search history.

(56) References Cited

U.S. PATENT DOCUMENTS

| 3,557,372 A | | 1/1971 | Ede | |
|---|---|---|---|---|
| 5,165,064 A | * | 11/1992 | Mattaboni | 356/141.2 |
| 5,585,799 A | * | 12/1996 | Yankielun et al. | 342/115 |
| 5,867,800 A | * | 2/1999 | Leif | 701/23 |
| 5,995,884 A | * | 11/1999 | Allen et al. | 701/24 |
| 6,459,955 B1 | * | 10/2002 | Bartsch et al. | 700/245 |
| 7,079,923 B2 | * | 7/2006 | Abramson et al. | 700/245 |

FOREIGN PATENT DOCUMENTS

| EP | 1 331 537 | 7/2003 |
|---|---|---|
| WO | 00/38029 | 6/2000 |
| WO | 01/06904 | 2/2001 |
| WO | 01/42867 | 6/2001 |

OTHER PUBLICATIONS

English Language Abstract of Japanese Patent Application No. 2002-354139, dated Dec. 12, 2002.

* cited by examiner

*Primary Examiner*—Richard M. Camby
(74) *Attorney, Agent, or Firm*—Staas & Halsey LLP

(57) ABSTRACT

A control system of a robot cleaner including a signal transmitting unit and a cleaning unit is provided. The signal transmitting unit wirelessly transmits reference signals, while the cleaning unit receives the reference signals from the signal transmitting unit and performs cleaning while moving through a region to be cleaned set in accordance to the received reference signals. Accordingly, the present invention causes the robot cleaner to be efficient in cleaning a local region of a given large area and provides for convenient use of the robot cleaner.

13 Claims, 3 Drawing Sheets

CONTROL SYSTEM OF A ROBOT CLEANER

CROSS-REFERENCE TO RELATED APPLICATIONS

This application claims the benefit of Korean Application No. 2003-53175, filed Jul. 31, 2003, in the Korean Intellectual Property Office, the disclosure of which is incorporated herein by reference.

BACKGROUND OF THE INVENTION

1. Field of the Invention

The present invention relates to a control system of a robot cleaner, which performs cleaning while autonomously moving through a region to be cleaned.

2. Description of the Related Art

A manual vacuum cleaner sucks up dust and other small particles of dirt, and collects the dust and particles of dirt in an internal container while being moved by a user through a region to be cleaned. According to a manual vacuum cleaner with separate components of a cleaner body and a vacuum head connected to each other by a flexible hose, the cleaner body is drawn to a desired position when a user moves while gripping the vacuum head. Thus, manual vacuum cleaners are inconvenient because a user must move through the region to be cleaned while holding the manual vacuum cleaner itself or the vacuum head. Further, manual vacuum cleaners are also problematic because noise is generated due to an operation of a motor that generates suction force, and the user has to do the actual moving of the manual vacuum and the cleaning work.

In view of the above-described problems presented by manual vacuum cleaners, a variety of automatic cleaners capable of performing cleaning operations while autonomously moving through a region to be cleaned, such as robot cleaners, have been proposed and developed.

Since the robot cleaners are not provided with a function to determine the shape of the region to be cleaned, the robot cleaners move through the region according to previously input data, or the robot cleaners autonomously move through the region using sensors capable of detecting obstructions.

When the area to be cleaned by the conventional robot cleaner is small, the conventional robot cleaner can be used without causing a burden to the user. However, when the area to be cleaned is large, it becomes necessary to divide the large area into smaller regions rather than assign the entire large area to the conventional robot cleaner. That is, in a case where a particular region of the given large area contains dust or other particles of dirt, the conventional robot cleaner can only clean the divided local regions of the given large area.

Further, the user is inconvenienced when a large area has to be subdivided into smaller areas because the conventional robot cleaner requires the user to input data in order to set the regions, and because it is difficult to precisely set the region, the setting of the region is usually based on subjective estimate of the user. Accordingly, the conventional robot cleaner presents a problem, as the conventional robot cleaner is not able to easily clean local regions of a given large area.

SUMMARY OF THE INVENTION

Accordingly, it is an aspect of the present invention to provide a control system of a robot cleaner, which is capable of cleaning local regions of a large area.

The foregoing and/or other aspects of the present invention are achieved by providing a control system of a robot cleaner, including a signal transmitting unit to wirelessly transmit reference signals, and a cleaning unit to receive the reference signals from the signal transmitting unit, and to perform cleaning while moving within a region to be cleaned set according to the received reference signals.

Additional aspects and advantages of the invention will be set forth in part in the description which follows and, in part, will be obvious from the description, or may be learned by practice of the invention.

According to an aspect of the present invention, the cleaning unit sets the region to be cleaned to be a region around the signal transmitting unit that is surrounded by a boundary spaced apart from the signal transmitting unit by a predetermined distance.

According to yet another aspect of the present invention, the reference signals are infrared signals.

The signal transmitting unit transmits the reference signals in at least three directions.

According to an aspect of the present invention, the signal transmitting unit includes a unit body including a transmitter, and a tripod-shaped support supporting the unit body.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
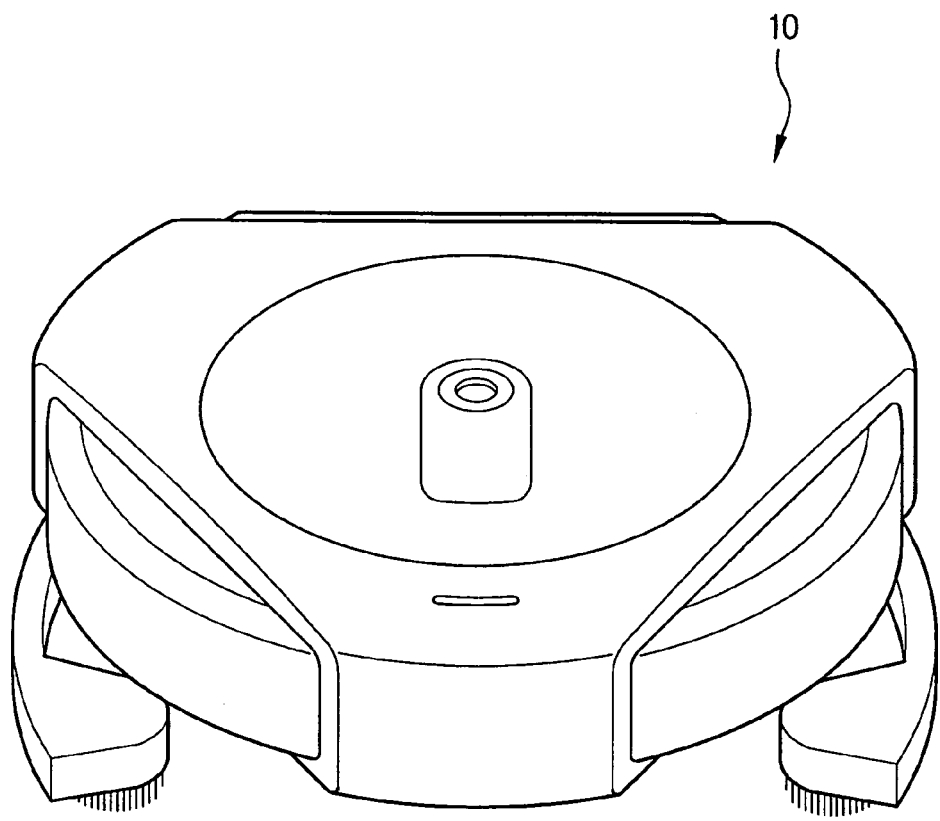
FIG. 1 is a perspective view of a control system of a robot cleaner, according to an aspect of the present invention.
Figure 1:
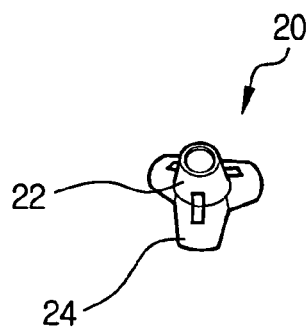

Reference will now be made in detail to the present preferred embodiments of the present invention, examples of which are illustrated in the accompanying drawings, wherein like reference numerals refer to like elements throughout.

Figure 2:
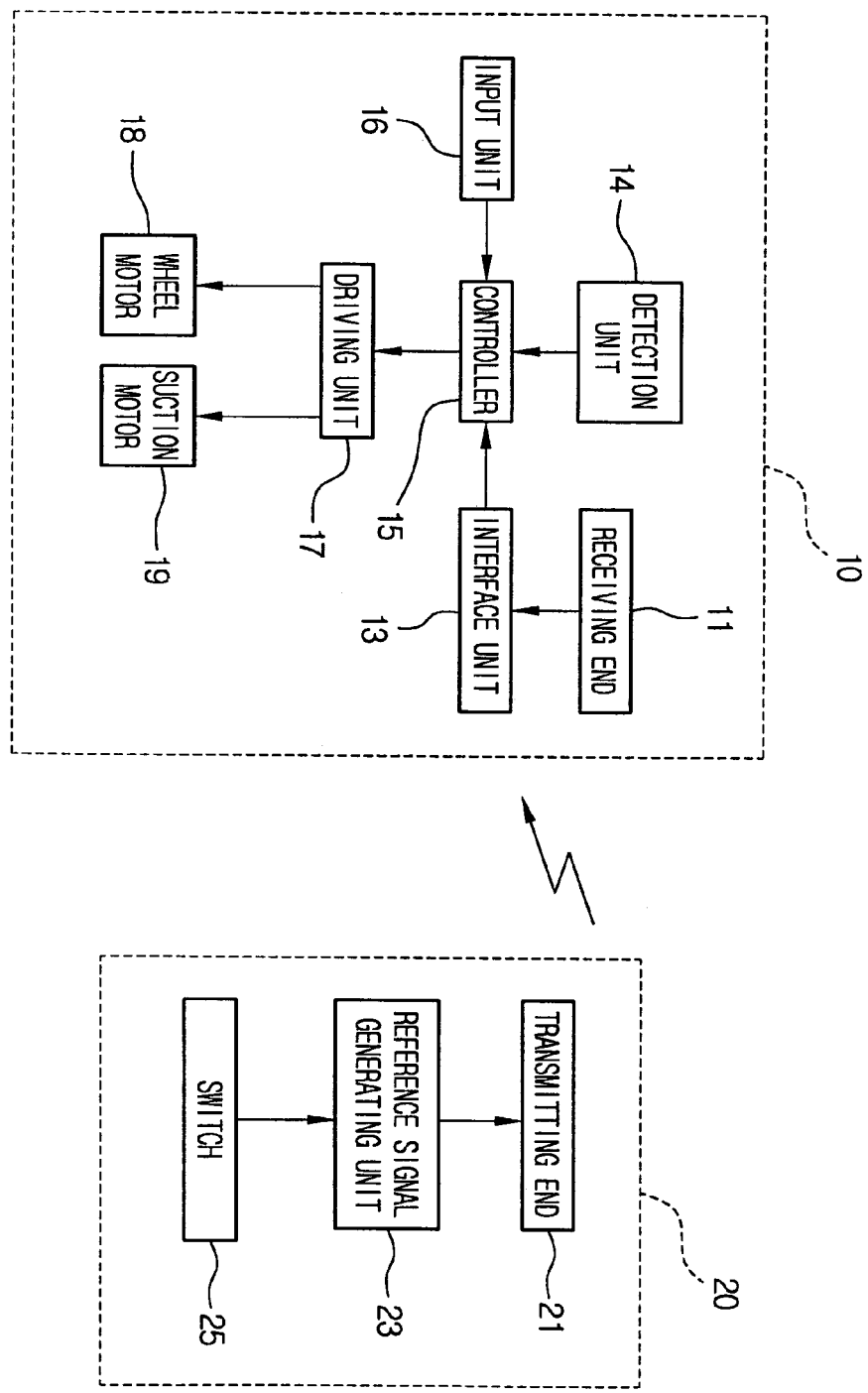
FIG. 2 is, a block diagram of the control system of the robot cleaner.
Figure 3:
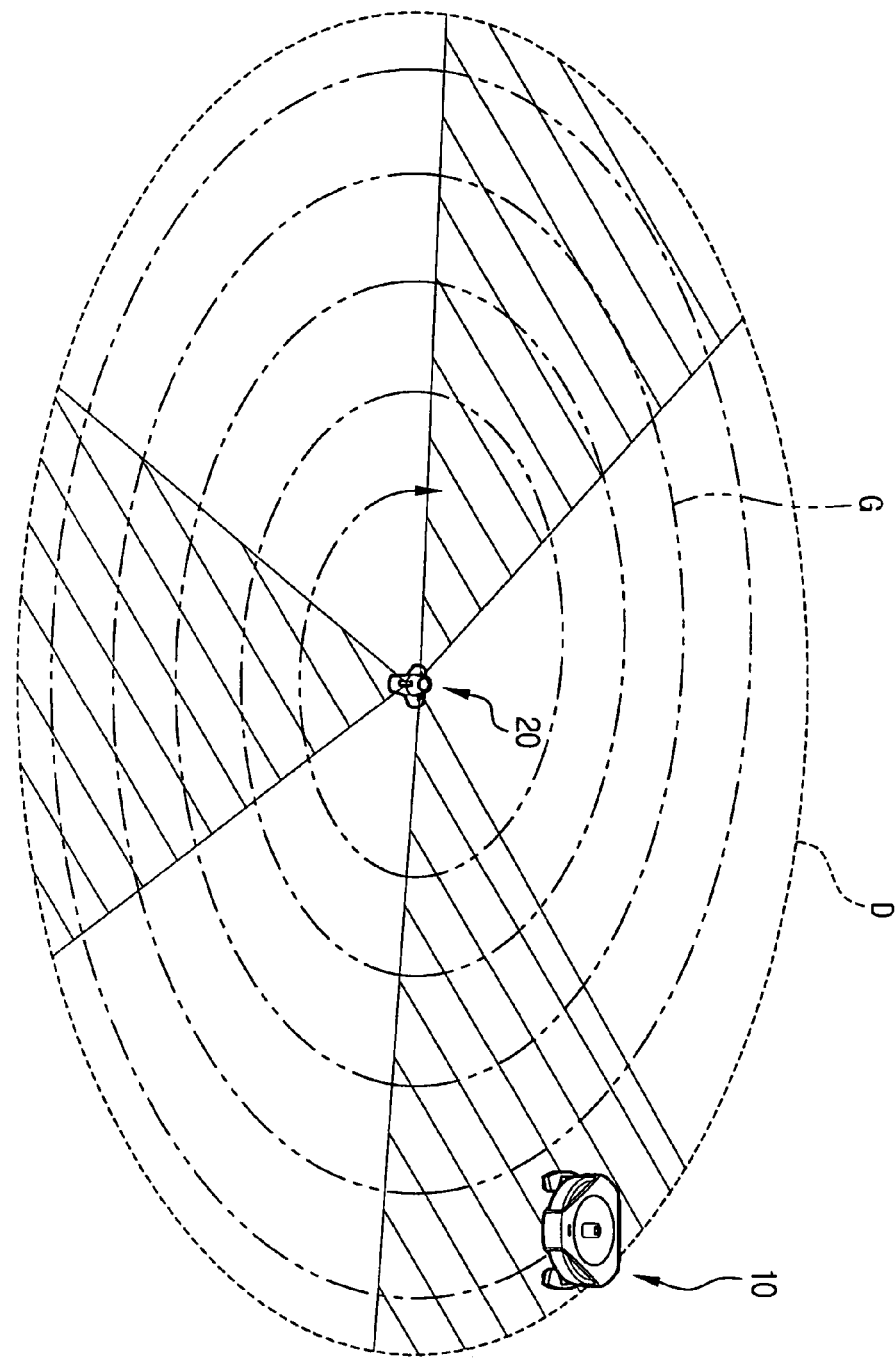
FIG. 3 is a perspective view to show a state in which the robot cleaner combined to the control system moves through a set region to be cleaned.

FIG. 1 is a perspective view of a control system of a robot cleaner, according to an aspect of the present invention. FIG. 2 is a block diagram of the control system of the robot cleaner. FIG. 3 is a perspective view to show a state in which the robot cleaner combined to the control system of FIG. 1 moves through a set region to be cleaned. FIG. 3 illustrates an example in which a cleaning unit 10 and a signal transmitting unit 20 are deployed in a local region that is part of a larger area to collect dust and/or other small particles of dirt.

The signal transmitting unit 20 wirelessly transmits reference signals to set a region to be cleaned D. The cleaning unit 10 receives the reference signal transmitted from the signal transmitting unit 20, and cleans a region D set according to the reference signal while moving through the entire set region D.

The cleaning unit 10 includes, a controller 15 that controls an overall operation of the cleaning operation. Further, an interface unit 13 that performs impedance matching with respect to the reference signal received from a receiving end 11 and inputs the matched reference signal to the controller 15, a detection unit 14 that detects an obstruction during movement of the robot cleaner, and an input unit 16 that receives a setting command from a user are connected to an input side of the controller 15. A driving unit 17 that drives a wheel motor 18 and a suction motor 19 is connected to an output side of the controller 15.

The wheel motor 18 is connected to two driving wheels mounted on both sides of a front bottom of the cleaning unit 10 and an auxiliary wheel mounted on a rear of the bottom of the cleaning unit 10, which are used to allow the cleaning unit 10 to move. The wheel motor 18 performs a forward movement, a rearward movement, and a rotation in response to the control of the controller 15 to change a movement direction of the cleaning unit 10.

The suction motor 19 generates a suction force to suck up dust and other particles of dirt on a surface through a suction opening provided on the bottom of the cleaning unit 10.

As shown in FIG. 1, the signal transmitting unit 20 includes a unit body 22 that is vertically erected and a support 24 that extends outward from a center of the unit body 22 in three directions.

The support 24 is constructed similar to a tripod shape. As a result, the signal transmitting unit 20 has approximately a triangular pyramid shape to allow the user to have an easy grip while the user is carrying the signal transmitting unit, and be stably put on a support surface.

A transmitting end 21, a reference signal generating unit 23 and a switch 25, which generate the reference signals, are provided in the unit body 22 of the signal transmitting unit 20. The switch 25 is selectively turned on and off in response to manipulation by the user. When the switch 25 is turned on, an operation signal is output to the reference signal generating unit 25, the reference signal generating unit 25 generates infrared signals in response to the operation signal, and the infrared signals are transmitted to an outside of the unit body 22 through the transmitting end 21. Accordingly, the infrared signals are transmitted in three directions.

The cleaning unit 20 sets a region to be cleaned to a region around the signal transmitting unit 20 to clean a desired local region around the signal transmitting unit 20. Referring to FIG. 3, the cleaning unit 10 receives an infrared signal, and sets the region to be cleaned D. In this case, the set region D is limited to a region that the infrared signals may reach and to a region surrounded by a boundary spaced apart from the signal transmitting unit by a set distance.

In a case where a local region of a given large area is desired to be cleaned, the user disposes the signal transmitting unit 20 at a center of the local region to be clean, and disposes the cleaning unit 20 at a position spaced apart from the signal transmitting unit 20 by the set distance, for example, 1 m. Thereafter, the user turns on the switch 25. The signal transmitting unit 20 transmits the infrared signals in three directions. The cleaning unit 10 receives an infrared signal from the signal transmitting unit 20, and thereafter controls the driving unit 17 to move within the set region D. In more detail, the control 15 causes the cleaning unit 10 to perform the cleaning operation by driving the suction motor 19 while changing a movement direction of the cleaning unit 10 according to a previously programmed movement track.

Furthermore, when the controller 15 detects an obstruction within the set region through the detection unit 14, the controller 15 stops the cleaning operation, or resumes the cleaning operation after changing the movement direction of the cleaning unit 10.

As is apparent from the above description, an aspect of the present invention provides a control system of a robot cleaner, in which a cleaning unit is capable of collecting dust and other particles of dirt while autonomously moving within a region set according to reference signals transmitted from a signal transmitting unit, thus, causing the robot cleaner to be efficient in cleaning desired local regions of a given large area and providing convenient use of the robot cleaner.

Although a few preferred embodiments of the present invention have been shown and described, it would be appreciated by those skilled in the art that changes might be made in these embodiments without departing from the principles and spirit of the invention, the scope of which is defined in the claims and their equivalents.

What is claimed is:

1. A control system of a robot cleaner, comprising:
   a signal transmitting unit to wirelessly transmit reference signals, and to set a region circumferentially surrounding the signal transmitting unit to be cleaned; and
   a cleaning unit to receive the reference signals from the signal transmitting unit, and to clean the region surrounding the signal transmitting unit, the region to be cleaned set in accordance with the received reference signals.

2. The control system as set forth in claim 1, wherein the cleaning unit sets the region to be cleaned to a region around the signal transmitting unit surrounded by a boundary spaced apart from the signal transmitting unit by a predetermined distance.

3. The control system as set forth in claim 1, wherein the reference signals are infrared signals.

4. The control system as set forth in claim 1, wherein the signal transmitting unit transmits the reference signals in at least three directions.

5. The control system as set forth in claim 1, wherein the signal transmitting unit comprises:
   a unit body including a transmitter; and
   a tripod-shaped support to support the unit body.

6. The control system as set forth in claim 1, wherein the cleaning unit further comprises:
   a controller to control an overall operation of a cleaning operation;
      an interface unit to perform impedance matching with respect to the reference signals, and to input the matched reference signal to the controller;
   a detection unit to detect an obstruction during movement of the robot cleaner;
   an input unit to receive a setting command; and
   a driving unit to drive a wheel motor and a suction motor connected to an output side of the controller.

7. The control system as set forth in claim 6, wherein the signal transmitting unit further comprises:
   a unit body vertically erected; and
   a support unit extending outward from a center of the unit body in three directions.

8. The control system as set forth in claim 7, wherein the signal transmitting unit further comprises:
   a transmitting end to transmit reference signals to an outside of the unit body;
   a reference signal generating unit to generate reference signals in response to operation signals; and
   a switch provided to allow user input to the signal transmitting unit.

9. The control system as set forth in claim 8, wherein the reference signals are infrared signals.

10. The control system as set forth in claim 9, wherein the controller stops the cleaning operation upon detection of an obstruction via the detection unit.

11. The control system as set forth in claim 10, wherein the controller resumes the cleaning operation upon changing the movement direction of the cleaning unit.

12. A control system of a robot cleaner, comprising:
a signal transmitting unit to wirelessly transmit reference signals; and
a cleaning unit to receive the reference signals, and to set a region circumferentially surrounding the signal transmitting unit to be cleaned in relation to a location of the signal transmitting unit setting the region circumferentially surrounding the signal transmitting unit within a circumferential boundary spaced from the signal transmitting unit by a predetermined distance.

13. A control system of a robot cleaner, comprising:
a signal transmitting unit wirelessly transmitting reference signals and setting a region to be cleaned limited to a circumferential area surrounding the signal transmitting unit that the reference signals are able to reach; and
a cleaning unit receiving the reference signals from the signal transmitting unit and cleaning the circumferential area surrounding the signal transmitting unit that the reference signals are able to reach, the region to be cleaned set in accordance with the received reference signals.

* * * * *